March 31, 1925.  A. R. KEYES  1,531,663
AUTOMOBILE BED
Filed Nov. 15, 1923
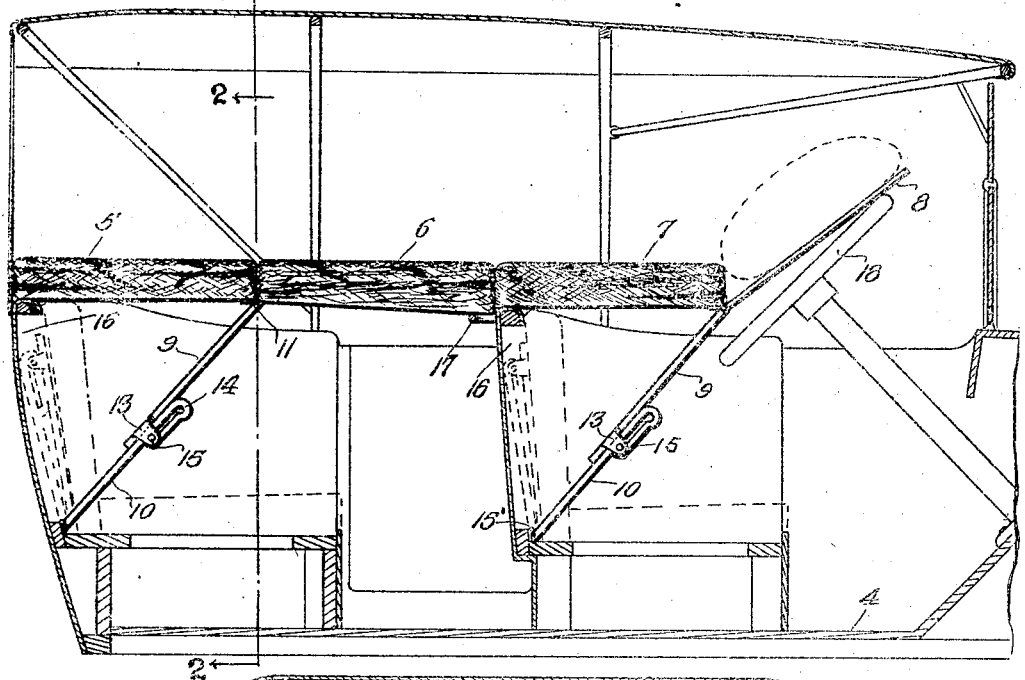
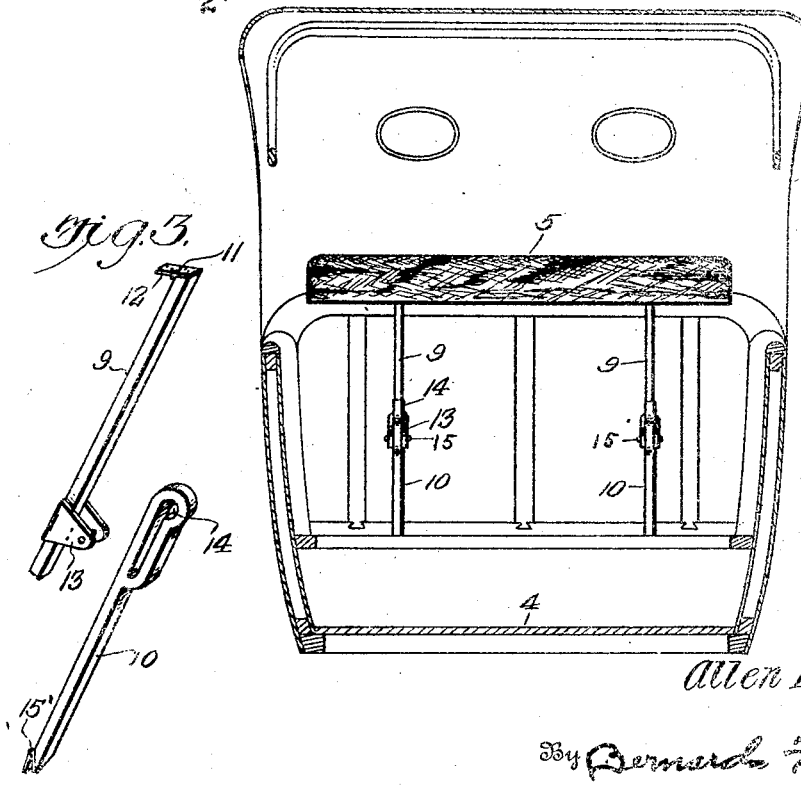
Inventor
Allen R. Keyes,
By Bernard F. Garvey
Attorney Patented Mar. 31, 1925.

1,531,663

UNITED STATES PATENT OFFICE.

ALLEN R. KEYES, OF EMPORIA, KANSAS.

AUTOMOBILE BED.

Application filed November 15, 1923. Serial No. 674,943.

*To all whom it may concern:*

Be it known that I, ALLEN R. KEYES, a citizen of the United States, residing at Emporia, in the county of Lyon and State of Kansas, have invented certain new and useful Improvements in Automobile Beds, of which the following is a specification.

This invention consists of an automobile bed and has for an object the provision of suitable mechanism in an automobile which permits arrangement of the automobile seats into a position where they may be used with facility and expedition as a bed.

A co-ordinate object of the invention is to provide incumbersome mechanism which will effectively hold the seats in the desired position, the mechanism being foldable into an inconspicuous position back of the seats when not in use.

A further object of the invention is to provide mechanism which automatically moves into an operative position when the seats are moved into position for use as a bed and conversely to provide mechanism which automatically moves into an inoperative position when the seats are urged into a normal position in the automobile body.

Other objects of the invention will be apparent from the following description of the present preferred form of the invention taken in connection with the accompanying drawings wherein:—

Fig. 1 is a fragmentary longitudinal sectional view of a motor vehicle body illustrating the application of the present invention;

Fig. 2 is a vertical sectional view taken on the line 2—2 of Fig. 1 looking in the direction of the arrows; and Fig. 3 is a perspective view of a pair of the bars employed for holding the seats in position as a bed, the bars being shown disconnected.

In order to illustrate the application of the present invention an automobile body 4 is shown which may be of standard or any desired construction and in the present instance is shown to be of the touring car type having a front and rear seat. The present invention contemplates the employment of the back 5 of the rear seat, the bottom 6 of the rear seat and the back 7 of the front seat to which latter the metal covering 8, used under the front seat, is engaged.

When it is desired to convert the seats of the automobile body into a bed, as illustrated in Figs. 1 and 2, the backs 5 and 7 of the vehicle seats are swung upwardly into a horizontal position so as to rest on top of the upper margins of the seat frames. The backs are held in position by suitable mechanism which in the present instance consists of inter-connected bars 9 and 10. Each bar 9 is rectangular in cross section and is provided at one end with a leaf hinge 11 one of the leaves 12 of which is adapted for securement to the inner face of the seat back while the opposite leaf is fixedly secured to the terminal of the bar 9. A pair of perforate ears 13 are formed adjacent the opposite end of the bar 9 and are adapted to straddle the bar 10. The bar 10 is provided at one end with an inclosed bayonet loop 14 in which a pin 15 is adapted to ride. The opposite end of the bar 10 is equipped with a hinge 15' one end of which is fixedly secured to said bar 10 and the opposite end engaged with the rear of the seat frame so as to be hidden from view when the seat back is in its normal position. Upon reference to Fig. 1 of the drawings it will be apparent that when the seat backs are in a horizontal position the pin 15 lies in the inner end of the bayonet loop 14, whereas when the seat back is to be folded into its normal position the end thereof, which is engaged by the bar 9, is first moved upwardly until the pin 15 moves into the outer end of the bayonet groove after which the back is permitted to gravitate into its normal position. This causes the bars 9 and 10 to be folded together and move into a compartment 16 formed in the back of each seat frame. In this way, the bars 9 and 10 will not be exposed to view when the seat backs are in a normal position. The seat bottom 6 which forms the intermediate part of the bed is positioned between the seat backs 5 and 7 when the latter are in a horizontal position and are supported by the robe rack 17 and bars 9. It will be noted that the hinged leaves 12 of the bars 9 support the front ends of the seat back 5 leaving the other leaf of each hinge to lie beneath the seat bottom 6.

The bars 9 which are mounted in the front seat of the vehicle have the upper ends thereof hingedly or otherwise connected to the metal cover 8 the latter being adapted for engagement with the steering wheel 18 of the vehicle and capacitating as a head rest upon which a pillow or the like may be positioned.

From the above it is apparent that the seats of the vehicle may be converted into a bed with facility and expedity without resorting to the use of accessories. The construction is such that a rigid yet comfortable bed is provided which will ably withstand the strain imposed thereon. Moreover, the mechanism used for supporting the portions of the seat in position is used as a bed and foldable so as to occupy a minimum amount of space when not in use, and the bed is at a sufficient elevation to accommodate baggage and other paraphernalia therebeneath.

Various changes may be made in this device especially in the details of construction, proportion and arrangement of parts within the scope of the claims hereto appended.

What is claimed is:—

1. In combination with a vehicle body including seats with movable seat portions, mechanism engageable with the vehicle body and seat portions to retain the latter in a horizontal position on top of the seat frames, said mechanism being foldable immediately in back of said seat portions when the latter are used as seats.

2. Mechanism for supporting automobile seats in position for use as a bed including interconnected bars engaged with the seat backs and seat frames said bars being movable into a fixed position when the seat backs are moved to a horizontal plane, to support said backs; said bars being foldable behind said seat backs when the latter are returned to their normal positions.

3. In combination with an automobile body including front and rear seats having backs and bottoms movable independently of the seat frames, mechanism to support said backs and one of said bottoms in a horizontal plane on top of the seat frame to provide a supporting structure without altering said frames, said mechanism being foldable to lie behind the seat backs when the latter are in their normal positions on the seat frames.

4. In combination with an automobile body including seat frames equipped with movable back and bottom cushion parts, and a steering wheel; interconnected bars hingedly mounted on each seat frame, and normally concealed behind the back cushion of each seat, for supporting said cushion parts, in conjunction with the tops of the seat frames, in a horizontal plane on top of said frames, and means connected to one of said cushion parts and resting upon said steering wheel to serve as a head rest.

In testimony whereof I affix my signature.

ALLEN R. KEYES.